US012594748B2

(12) United States Patent
Christiaens et al.

(10) Patent No.: US 12,594,748 B2
(45) Date of Patent: Apr. 7, 2026

(54) FLOOR ELEMENT

(71) Applicant: FLOORING INDUSTRIES LIMITED, SARL, Bertrange (BE)

(72) Inventors: Quinten Christiaens, Harelbeke (BE); Jochen Bossuyt, Tiegem (BE); Kristof Van Vlassenrode, Deinze (BE)

(73) Assignee: UNLIN GV, Wielsbeke (BE)

( * ) Notice: Subject to any disclaimer, the term of this patent is extended or adjusted under 35 U.S.C. 154(b) by 0 days.

(21) Appl. No.: 17/757,552

(22) PCT Filed: Nov. 30, 2020

(86) PCT No.: PCT/IB2020/061275
§ 371 (c)(1),
(2) Date: Jun. 16, 2022

(87) PCT Pub. No.: WO2021/123979
PCT Pub. Date: Jun. 24, 2021

(65) Prior Publication Data
US 2023/0007825 A1     Jan. 12, 2023

(30) Foreign Application Priority Data
Dec. 19, 2019    (BE) .................................. 2019/5947

(51) Int. Cl.
*B32B 27/06*          (2006.01)
*B32B 5/18*           (2006.01)
(Continued)

(52) U.S. Cl.
CPC .............. *B32B 27/065* (2013.01); *B32B 5/18* (2013.01); *B32B 27/20* (2013.01); *B32B 27/22* (2013.01);
(Continued)

(58) Field of Classification Search
CPC ........... B32B 2250/05; B32B 2255/10; B32B 2255/26; B32B 2262/101; B32B 2266/025; B32B 2266/06; B32B 2307/102; B32B 2307/4023; B32B 2307/554; B32B 2307/72; B32B 2307/732; B32B 2419/04;
(Continued)

(56) References Cited

U.S. PATENT DOCUMENTS

| | | | |
|---|---|---|---|
| 11,091,919 B2 * | 8/2021 | Van Vlassenrode | .... B32B 9/045 |
| 2012/0291387 A1 | 11/2012 | Keane | |

(Continued)

FOREIGN PATENT DOCUMENTS

| | | | |
|---|---|---|---|
| CA | 1046869 A | 1/1979 | |
| CN | 106183273 A | 12/2016 | |
| WO | WO-2018087638 A1 * | 5/2018 | ............. B29C 70/08 |

OTHER PUBLICATIONS

Search Report from corresponding Belgian Application No. BE201905947, Sep. 9, 2020.
(Continued)

*Primary Examiner* — Hai Vo
(74) *Attorney, Agent, or Firm* — Workman Nydegger

(57)          ABSTRACT

A floor element includes a substrate made of polymer, a top layer on one of the two sides of the substrate and a polymeric foamed layer on the other of the two sides of the substrate. The density of the polymeric foamed layer is less than 120 kg/m³.

10 Claims, 1 Drawing Sheet

(51) Int. Cl.

| | |
|---|---|
| *B32B 27/20* | (2006.01) |
| *B32B 27/22* | (2006.01) |
| *B32B 27/30* | (2006.01) |
| *E04F 15/10* | (2006.01) |

(52) U.S. Cl.
CPC .......... *B32B 27/304* (2013.01); *E04F 15/107* (2013.01); *B32B 2255/10* (2013.01); *B32B 2255/26* (2013.01); *B32B 2266/025* (2013.01); *B32B 2266/06* (2013.01); *B32B 2307/554* (2013.01); *B32B 2307/72* (2013.01); *B32B 2307/732* (2013.01); *B32B 2471/00* (2013.01)

(58) Field of Classification Search
CPC ... B32B 2471/00; B32B 27/065; B32B 27/08; B32B 27/12; B32B 27/20; B32B 27/22; B32B 27/304; B32B 5/022; B32B 5/18; E04F 15/105; E04F 15/107; E04F 2290/041
See application file for complete search history.

(56) References Cited

U.S. PATENT DOCUMENTS

| | | | |
|---|---|---|---|
| 2014/0311086 A1 | 10/2014 | Braun | |
| 2015/0259928 A1* | 9/2015 | Keane ..................... | E04F 15/18 |
| | | | 52/309.9 |
| 2017/0144427 A1* | 5/2017 | Klackmann-Schneider ................ | |
| | | | B32B 37/14 |
| 2018/0058077 A1* | 3/2018 | Alfieri ................... | B32B 21/047 |
| 2018/0135313 A1* | 5/2018 | Chen ..................... | C09D 127/06 |
| 2018/0283014 A1 | 10/2018 | Hodgkins et al. | |
| 2019/0145109 A1* | 5/2019 | Esbelin ................... | B32B 5/24 |
| | | | 428/213 |
| 2019/0330859 A1 | 10/2019 | Granados Pelaez | |
| 2020/0063443 A1* | 2/2020 | Boucké ..................... | B32B 5/18 |

OTHER PUBLICATIONS

International Search Report from PCT Application No. PCT/IB2020/061275, Mar. 11, 2021.
Chinese Search Report from Corresponding Chinese Patent Application No. CN2020800825351, Aug. 2, 2023.

* cited by examiner

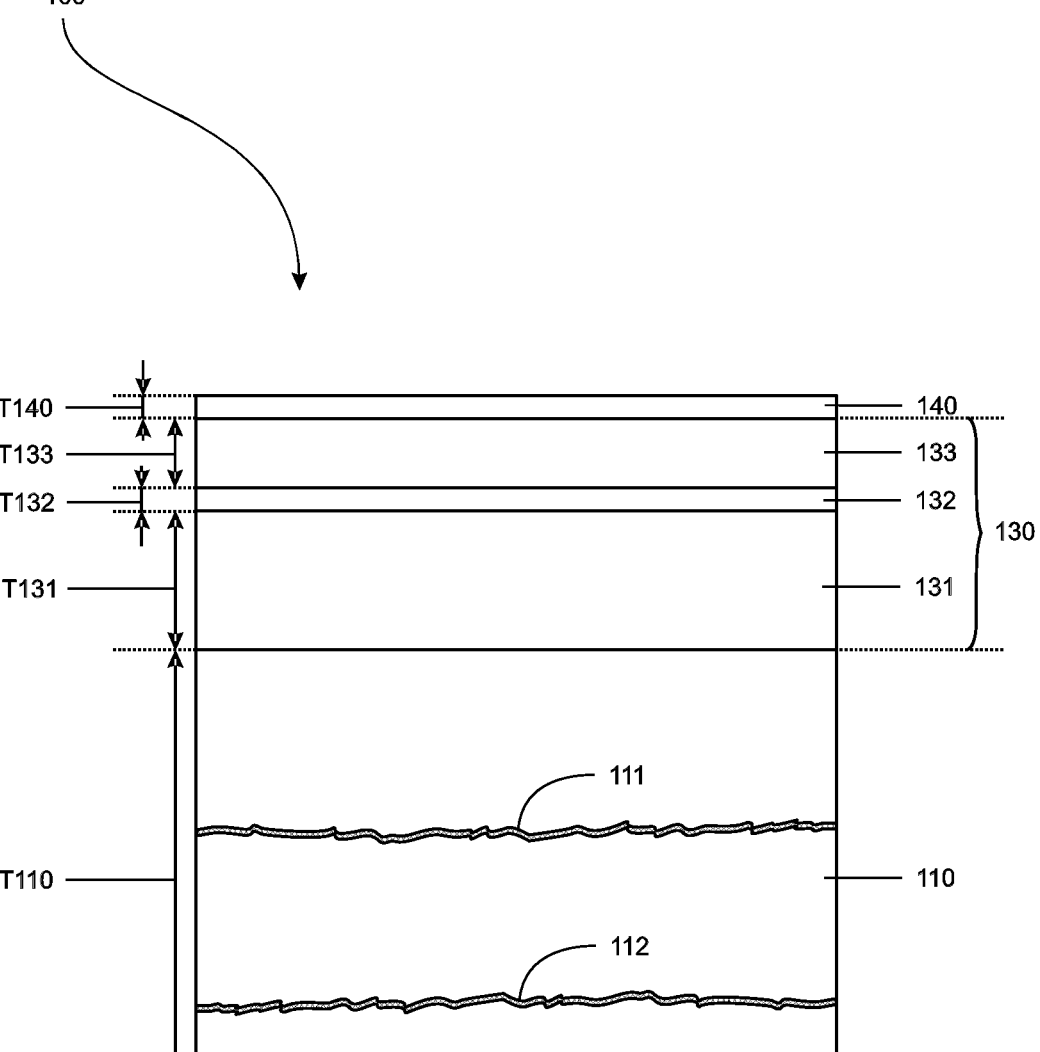

FLOOR ELEMENT

BACKGROUND

The invention relates to floor elements, in particular polymer floor elements.

Polymer floor elements, such as floor elements made of MDF and HDF wood fiber boards, are known. They are used in particular to imitate parquet made of solid wood.

A technical challenge is imitation of the sound transmission and sound reflection of parquet of this kind. A low sound transmission value has the advantage that sound caused by tapping on the floor elements is transmitted less to the structures and rooms under this floor element. A low sound reflection value has the advantage that sound caused by tapping on the floor elements is reflected less in the room where the floor element is located.

It is an aim of the invention to provide floor elements that have good sound transmission and sound reflection values.

SUMMARY

According to a first independent aspect of the invention, a floor element is provided, the floor element comprising a substrate made of polymer, a top layer on one of the two sides of the substrate and a polymeric foamed layer on the other of the two sides of the substrate, with the characteristic feature that the density of the polymeric foamed layer is less than 120 kg/m$^3$.

The density is preferably below 100 kg/m$^3$, for example below 70 kg/m$^3$, such as between 30 and 55 kg/m$^3$.

This polymeric foamed layer, also called "pad", is the bottommost polymer layer of the floor element.

The presence of a layer of foam (or foamed layer) as described has the surprising effect that sound that is transmitted by the floor element to underlying rooms and structures (sound transmission) is limited. Layers of foam thinner than 0.8 mm contribute little to reducing sound transmission, whereas thicker layers of foam, thicker than 2 mm, have a negative influence on the integrity of the floor elements at the level of optional coupling systems along the edges of the floor element.

According to some embodiments, the polymeric foamed layer may have a thickness between 0.75 and 2.0 mm.

The thickness is preferably selected from 0.8 and 1.75 mm, for example between 0.9 and 1.5 mm, for example 1 mm.

According to some embodiments, the polymeric foamed layer may consist of open-cell foam.

The open-cell nature contributes to performance with respect to the reduction of transmitted sound.

According to some embodiments, the polymeric foamed layer may consist of polyethylene.

According to some embodiments, the polyethylene may be crosslinked polyethylene, for example polyethylene that has been crosslinked by irradiation, or so-called IXPE.

The polymeric foamed layer on the other of the two sides of the substrate preferably covers substantially the whole second side of the substrate. The polymeric foamed layer on the other of the two sides of the substrate may preferably be glued on. In that case, preferably a glue is used from the group of so-called "hot melt moisture cured" glues, or HMMC glues. Preferably a PU glue is used, such as an HMMC PU glue.

In an alternative embodiment, the polymeric foamed layer may be laminated-on thermally.

According to some embodiments, the substrate may comprise at least one layer consisting of semi-rigid or rigid polymer, which provides the contact surface with the top layer.

Moreover, within the context of the present invention, flexible polymer (for example flexible PVC) means a polymer that comprises 40 or more than 40 phr plasticizers. Semi-rigid or semi-flexible polymer means polymer that comprises between 10 and 40 phr plasticizers, whereas rigid polymer comprises less than or exactly 10 phr plasticizer.

In the context of the present invention, phr means "parts per hundred resin", this is the quantity of parts by weight of the component per hundred parts by weight of polymer.

According to some embodiments, the top layer may be layered per se and consisting of N polymer layers, N>=2, one layer being a wearing layer and one layer being a decorative layer, and on this top layer optionally a coating, with the characteristic feature that $$ d * \left( -0.2 * \left( \sum_{i=1}^{N} d_i * P_i \right) + 62 \right) < 300 $$

wherein d is the total thickness of the substrate and the top layer (expressed in millimeters), $d_i$ the thickness of the i-th of the N layers is expressed in millimeters $P_i$ how much plasticizer there is in the polymer of the i-th of the N layers, expressed as phr.

According to a second independent aspect of the invention, a floor element is provided, the floor element comprising a substrate made of rigid or semi-rigid polymer, and a top layer on one of the two sides of the substrate, the substrate comprises at least one layer consisting of semi-rigid or rigid polymer, which provides the contact surface with the top layer, the top layer is layered per se and consisting of N polymer layers, N>=2, one layer being a wearing layer and one layer being a decorative layer, and on this top layer optionally a coating, with the characteristic feature that $$ d * \left( -0.2 * \left( \sum_{i=1}^{N} d_i * P_i \right) + 62 \right) < 300 $$

wherein d is the total thickness of the substrate and the top layer (expressed in millimeters), $d_i$ the thickness of the i-th of the N layers is expressed in millimeters and $P_i$ how much plasticizer there is in the polymer of the i-th of the N layers, expressed as phr.

Underneath the substrate, a polymeric foamed layer may optionally be present on the other of the two sides of the substrate, with density of the polymeric foamed layer less than 120 kg/m$^3$, which is not included in the total thickness d.

According to some embodiments of floor elements according to the first and/or second aspect, the following inequality may be valid $$ d * \left( -0.2 * \left( \sum_{i=1}^{N} d_i * P_i \right) + 62 \right) < 280 $$

The inventors have found, surprisingly, that the hardness of the surface of the floor elements is determined by the flexible and semi-rigid layers of the floor element that belong to the substrate, especially if the substrate comprises a rigid layer of polymer. A linear relationship was found between the hardness and the sum of the thicknesses (expressed in mm) of the layers in the top layer, multiplied by the content of plasticizer (expressed in phr). It was also found that contact sound is related quadratically to this hardness multiplied by the total thickness of the floor element, but without the optional underlying foamed layer (or pad). If the aforementioned inequalities are satisfied, a sufficiently low contact sound is obtained of less than 84 dB, or even less than 82 dB.

According to some embodiments of floor elements according to the first and/or second aspect, the top layer may comprise more than 2 layers and comprises at least one flexible or semi-rigid layer under the decorative layer.

According to some embodiments of floor elements according to the first and/or second aspect, the substrate of the floor element may comprise at least one layer with phr below 15 phr.

According to some embodiments of floor elements according to the first and/or second aspect, the substrate of the floor element may comprise at least one layer with phr below 10 phr.

Floor elements made of semi-rigid or rigid substrate display a less good result in respect of sound reflection. The reflected sound on impact (typically walking on the surface with stiletto heels) is significantly present. Providing a top layer with the characteristic features as described above according to the second aspect of the invention reduces the sound reflection significantly. If these measures are also taken together with the characteristic features of the first aspect of the invention, the transmitted sound will also decrease further compared to floor elements that have the characteristic features of the first but not the characteristic features of the second aspect.

The top layer comprises various layers, such as a wearing layer (optionally provided with a varnish coat on the upper side), a decorative layer and optionally an underlying polymer layer, typically a flexible or semi-rigid PVC layer. The latter may be in contact with the substrate.

The optional underlying flexible or semi-rigid PVC layer preferably comprises PVC with 30 to 50 phr plasticizer, preferably between 35 and 45 phr plasticizer, such as between 36 and 38 phr plasticizer, for example 40 phr plasticizer. This layer may further also comprise fillers, for example between 150 and 300 phr fillers, for example 200 phr fillers. The thickness of the layer is preferably between 0.2 and 1.5 mm, such as between 0.25 and 0.9 mm, and preferably between 0.3 and 0.8 mm.

The decorative layer preferably comprises PVC, more preferably PVC with less than 10 phr plasticizer. Moreover, this decorative layer may also comprise additives such as $TiO_2$, stabilizers, impact improvers and processing aids. The thickness of the decorative layer, for example a decorative film, namely a film printed—either digitally or by rotary printing—with a decoration, is preferably between 70 and 100 μm, such as 80 μm.

The top layer further comprises a wearing layer. This semi-flexible polymer layer, for example semi-flexible PVC layer, preferably comprises 10 to 40 phr plasticizer, preferably between 25 and 35 phr. The wearing layer is transparent and is filler-free. The thickness of this layer is preferably between 0.1 and 1 mm, such as between 0.2 and 0.8 mm, for example 0.3 mm.

Preferably the wearing layer, the decorative layer and this optional flexible polymer layer are manufactured from PVC.

The PVC layers and materials described in the context of the first or second aspect of the invention preferably comprise PVC with a K-value between 50 and 90. PVC refers to polyvinyl chloride, or copolymers of vinyl chloride and vinyl acetate.

Generally, in the context of the present invention, plasticizers are inter alia esters of carboxylic acids (for example esters of phthalic acid, iso- or terephthalic acid, trimellitic acid and adipic acid), for example diisononyl phthalate (DINP), dioctyl terephthalate (DOTP), diisononyl-1,2-cyclohexanedicarboxylate (DINCH), esters of phosphoric acid, for example triaryl or trialkaryl phosphates, for example tricresyl phosphate, chlorinated or unchlorinated hydrocarbons, ethers, polyesters, polyglycols, sulfonamides, or combinations thereof.

The optional coating that may be present on the wearing layer preferably consists of UV-hardened polyurethane (PU) and has a thickness of between 5 μm and 30 μm, for example between 7.5 μm and 20 μm, e.g. 10 μm.

The floor elements may be provided on their upper side with a relief, which can be impressed therein during production by embossing.

Although for a floor element according to the first aspect the substrate may optionally consist of flexible polymer material, in the case of floor elements according to the second aspect, and in preferred embodiments of floor elements according to the first aspect, the substrate consists at least partly of semi-rigid or rigid polymer material, preferably semi-rigid or rigid PVC.

It should be noted that this substrate may also be WPC (wood particulate composite) or SPC (stone plastic composite). Moreover, this substrate may optionally also be a mineral substrate, for example cement-based substrates (based on for example OPC or magnesium oxychloride or oxy sulfate).

The substrate may be obtained by the extruding of one or more layers of polymer, or the calendering of one or more layers, and/or on the basis of fusing and pressing together of polymer particles under heat and pressure, or on the basis of combinations of these methods.

The thickness of the substrate, which in itself may consist of various layers, is preferably between 3.5 and 6 mm, more preferably between 3.5 and 5 mm.

The substrate may comprise one or more reinforcing elements or layers, for example one or more layers of glass-fiber fleeces or glass fiber cloths.

The substrate may be foamed or unfoamed. If foamed, the substrate preferably has a closed foam structure. Foaming may take place by chemical foaming, i.e. by adding solid or liquid agents (also called blowing agents), which at temperature will be converted to gas and therefore form open or closed foam structures. It may also take place by mechanical foaming, i.e. adding gas or air to the liquid form of the material. It may also be formed into foam by adding fillers, for example with spherical particles filled with blowing agent, which expand at elevated temperature, or by adding already expanded spherical particles.

The substrate preferably has a density between 0.8 and 1.8 kg/l in foamed form, or a density between 1.8 and 2.1 kg/l in unfoamed form.

The substrate may comprise fillers, such as inter alia glass fibers, calcium hydroxide (slaked lime), calcium carbonate and calcium hydrogen carbonate, and/or $CaMg(CO_3)_2$, talc, or also lightweight fillers such as hollow microspheres (Expancel). The aforementioned percentage by weight (wt %) is expressed as weight of the filler relative to the weight of the polymer, if applicable PVC, in which the filler is present. The amount of fillers is preferably between 100 and 300 phr, for example between 150 and 250 phr.

The substrate may further comprise various other substances, such as pigments and dyes, preservatives, antifungals, thermal stabilizers, UV-stabilizers, blowing agents, viscosity controllers, impact modifiers, and the like.

The substrate may be rigid or flexible, depending on the polymer or raw material used.

In the context of the present invention, flexible denotes that the products, when a strip of product is clamped on one side and can hang freely on the other opposite side, will hang down under its own weight. Flexible then also denotes that a product will hang down more than 35 centimeters per meter of projecting length under its own weight. Preferably a product will hang down more than 40 centimeters per meter of projecting length under its own weight, such as more than 50 centimeters per meter of projecting length. Rigid or stiff signifies on the other hand that a product will hang down less than 35 centimeters per meter of projecting length under its own weight.

The polymer used for the substrate is preferably PVC.

In the case of a rigid substrate made of PVC, the substrate comprises rigid or semi-rigid PVC, which may in total be between 2 mm and 6 mm thick, for example between 3 mm and 4.5 mm. Possibly one or more reinforcing layers are embedded in or attached to this substrate. Thus, for example, one of the reinforcing layers may provide the underside of the floor element.

For rigid substrates made of PVC, the substrate will thus mainly comprise rigid or semi-flexible PVC. The substrate may comprise one or more, for example two, reinforcing layers, which are embedded on or between the rigid or semi-flexible PVC layer or layers. The reinforcing layer or layers comprise a fibrous fleece, generally a glass-fiber fleece, in which the rigid or semi-rigid PVC is impregnated partly or completely. Glass-fiber fleeces with a weight per unit area between 25 and 150 g/m$^2$ may be used, for example fleeces with a weight per unit area between 30 and 75 g/m$^2$.

A part of the PVC may be present in the substrate above the uppermost of the one or more reinforcing layers, for example glass-fiber fleeces. The thickness of this PVC layer above the uppermost of the one or more reinforcing layers may be between 0.3 mm and 0.7 mm. The thickness of the PVC layer between the uppermost and bottommost reinforcing layers, if several reinforcing layers are provided, may vary between for example 2 and 4 mm. A part of the PVC may be present in the substrate under the bottommost of the one or more reinforcing layers. The thickness of this PVC layer under the bottommost of the one or more reinforcing layers may be between 0.3 mm and 0.7 mm. If one reinforcing layer is provided, this layer may be located centrally or eccentrically from the layer of rigid or semi-rigid PVC.

The rigid or semi-rigid PVC preferably comprises up to 15 phr plasticizer, preferably between 7 and 10 phr. The rigid or semi-rigid PVC preferably comprises up to 70 wt % fillers (relative to the total weight of the PVC composition).

For flexible substrates made of PVC, the substrate will mainly comprise flexible PVC or semi-rigid PVC. The substrate may comprise one or more, for example two, reinforcing layers that are embedded on or between the flexible or semi-flexible PVC layer or layers. The reinforcing layer or layers comprise a fibrous fleece, generally a glass-fiber fleece, in which the flexible or semi-rigid PVC is impregnated partly or completely. Glass-fiber fleeces with a weight per unit area between 25 and 150 g/m$^2$ may be used, for example fleeces with a weight per unit area between 30 and 75 g/m$^2$. In some embodiments the substrate comprises a reinforcing layer comprising a glass-fiber fleece, which will form the side of the substrate that comes into contact with the top layer, this is in contact with the decorative layer.

The substrate comprises flexible or semi-rigid PVC, which is in total between 1.2 mm and 6 mm thick, for example between 1.2 mm and 4.5 mm, in or on which the reinforcing layers are embedded.

A part of the PVC may be present in the substrate above the uppermost of the one or more reinforcing layers, for example glass-fiber fleeces. The thickness of this PVC layer above the uppermost of the one or more reinforcing layers may be between 0.3 mm and 2 mm. The thickness of the PVC layer between the uppermost and bottommost reinforcing layers, if several reinforcing layers are provided, may vary between for example 2 and 4 mm. A part of the PVC may be present in the substrate under the bottommost of the one or more reinforcing layers. The thickness of this PVC layer under the bottommost of the one or more glass-fiber fleeces may between 0.75 mm and 3 mm. If one reinforcing layer is provided, this layer may be located centrally or eccentrically of the layer of flexible PVC.

The flexible PVC or semi-rigid PVC preferably comprises more than 30 phr plasticizer, for example more than 35 phr, such as 36 phr or 38 phr. The flexible or semi-rigid PVC preferably comprises up to 65 wt % fillers (relative to the total weight of the PVC composition).

The floor elements, both those with flexible and with a rigid substrate, generally have a limited size of surface. They may be produced as "planks", preferably being rectangular surfaces with a width between 8 and 50 cm and length between 40 and 300 cm, preferably between 0.4 and 2.0 m long and between 0.12 and 0.45 m wide.

The floor element may thus comprise a top layer, which, under the decorative layer, comprises a flexible or semi-rigid polymer layer, for example made of PVC, and a substrate that comprises flexible or semi-rigid layers of polymer, for example of PVC.

At the level of the contact surface between substrate and top layer, very similar layers may touch one another.

Therefore, the top layer stops, and the substrate begins, at the first subsequent layer under the decorative layer, which comprises an amount of plasticizer of less than 15 phr, unless there is no layer that comprises less than 15 phr. In this case the top layer stops at and the substrate begins with the bottommost polymer layer of the floor element, if the underside of the floor element is not a polymeric foamed layer with a density less than 120 kg/m$^3$;

the next to bottommost polymer layer, if the underside of the floor element is a polymeric foamed layer with a density less than 120 kg/m$^3$. This polymeric foamed layer with a density less than 120 kg/m$^3$ is then the bottommost layer of the floor element.

The floor elements themselves may be flexible or rigid, often following the flexibility or rigidity of the substrate.

The substrate and the top layer may be bonded to one another in various ways.

Thus, the top layer may be glued on the substrate, for example with a glue, for example a heat melt moisture cured or HMMC glue. PU (polyurethane) glues may be used, for example HMMC PU adhesives.

In an alternative embodiment, the top layer may be fused on the substrate, for example by thermal laminating.

According to yet another alternative embodiment, the various layers of the top layer may be bonded on the substrate, whether or not in pairs, for example by calendering of a first, flexible polymer layer onto the first side of the substrate, after which the decorative layer is heat-laminated to this flexible polymer layer, after which the wearing layer is heat-laminated to this decorative layer, after which optionally a UV-curing coating is applied. Optionally, the decorative layer and the wearing layer may be laminated at the same time.

According to some embodiments, the floor elements may be provided on one or more sides with a coupling means for coupling two floor elements to each other. This coupling means may be any coupling means as known in the prior art, for example tooth-and-groove coupling means, coupling means comprising click systems, coupling means comprising fold-down systems, coupling means comprising rolling profiles, and similar.

Then, in a third independent aspect of the invention, a floor covering is also provided that comprises more than one floor element according to one of the foregoing aspects of the invention.

The independent and dependent claims present specific and preferred features of the embodiments of the invention. Features of the dependent claims may be combined with features of the independent and dependent claims, or with features described above and/or hereunder, and in any suitable manner such as would be obvious to a person skilled in the art.

The aforementioned and other features, properties and advantages of the present invention will be explained by means of the following examples of embodiments, optionally in combination with the drawings.

The description of these examples of embodiments is given by way of explanation, without the intention of limiting the scope of the invention. The reference numbers in the description given hereunder refer to the drawings. The same reference numbers in optionally different FIGURES refer to identical or similar elements.

BRIEF DESCRIPTION OF THE DRAWINGS

For better illustration of the features of the invention, some preferred embodiments are described hereunder, as examples without any limiting character, referring to the appended drawings, in which:

FIG. 1 shows schematically the structure of a floor element 100 according to the first and second aspect of the invention.

DETAILED DESCRIPTION OF VARIOUS EMBODIMENTS

The present invention is described hereunder, making use of specific embodiments.

It should be noted that the term "comprising", for example as used in the claims, is not to be interpreted in a limiting sense, limiting to the elements, features and/or steps then following. The term "comprising" does not exclude the presence of other elements, features or steps.

Thus, the scope of an expression "an object comprising the elements A and B" is not limited to an object that only contains the elements A and B. The scope of an expression "a method comprising the steps A and B" is not limited to a method that only contains the steps A and B.

In light of the present invention, these expressions only signify that the relevant elements or steps for the invention are the elements or steps A and B.

In the specification given hereunder, reference is made to "an embodiment" or "the embodiment". Such a reference signifies that a specific element or feature, described on the basis of this embodiment, is comprised in at least this one embodiment.

The presence of the terms "in an embodiment" or "in the embodiment" at different places in this description does not, however, necessarily refer to the same embodiment, although it may well refer to one and the same embodiment.

Moreover, the properties or the features may be combined in any suitable way in one or more embodiments, as would be clear for a person skilled in the art.

FIG. 1 shows schematically the structure of a floor element 100 according to the first and second aspect of the invention. It comprises a substrate 110 with a foamed polymer layer 120 thereunder.

The substrate is formed from unfoamed PVC with a density of 1.89 kg/l and comprises 8 phr plasticizer. It also comprises two glass-fiber fleeces 111 and 112 each of 50 g/m$^2$. The total thickness of the substrate T110 is 4 mm.

Underneath the substrate there is a foamed, open-cell polymer layer 120. This layer or "pad" is made of cross-linked polyethylene, has a thickness T120 of 1 mm and a density of 55 kg/m$^3$.

On the substrate 110 there is a top layer 130 which is itself layered and consists of
a flexible polymer layer 131;
a decorative layer 132 and
a wearing layer 133.

On the wearing layer, a 12 µm thick PU varnish coat is applied (thickness represented as T140). This layer does not comprise any plasticizers.

The flexible polymer layer 131 is manufactured from unfoamed PVC with a density of 1.82 kg/l, has a plasticizer content P131 of 36 phr, a content of filler of 206 phr and a thickness T131 of 0.36 mm.

A decorative layer 132 is heat-bonded to this layer 131. The decorative layer is provided as a film printed with a decorative finish. The decorative layer 132 is manufactured from rigid PVC, has a plasticizer content P132 of 11 phr, a filler content of 0 phr, and a thickness T132 of 0.09 mm.

A wearing layer 133 is applied on top of the decorative layer. This is heat-bonded to the decorative layer 132.

The wearing layer 133 is manufactured from unfoamed and unfilled PVC, has a plasticizer content P133 of 34.5 phr and a thickness T133 of 0.55 mm.

Together, this gives a sum of "thicknesses multiplied by contents of plasticizer" for the top layer, being "T131\*P131+T132\*P132+T133\*P133", of 32.92 phr\*mm The total thickness d of the substrate and the top layer is T110+T120+T131+T132+T133, thus 5 mm.

The comparison $$d * \left( -0.2 * \left( \sum_{i=1}^{N} d_i * P_i \right) + 62 \right)$$

then also gives a value 277 phr\*mm$^2$, thus <280

The transmission test NF EN ISO 10140-1 (2013) gives a value of transmitted sound of 21 dB.

The reflection test NF S 31-074 gives a value of reflected sound of 76 dB.

It is clear that although the embodiments and/or the materials are discussed for supplying embodiments according to the present invention, various changes or modifications may be applied while remaining within the scope and/or the spirit of the present invention. The present invention is by no means limited to the embodiments described above, but may be implemented according to different variants while remaining within the scope of the present invention.

The invention claimed is:

1. A floor element comprising:

a substrate, a top layer on a first of two sides of the substrate, and a polymeric foamed layer of polyethylene on a second of the two sides of the substrate, wherein the substrate consists essentially of a layer of foamed rigid polyvinyl chloride (PVC) comprising:

10 phr or less of one or more plasticizers selected from the group consisting of esters of phthalic acid, esters of iso- or terephthalic acid, esters of trimellitic acid, esters of adipic acid, and esters of phosphoric acid, and at least 100 phr of fillers, wherein said layer is provided with the top layer at a contact surface, wherein the top layer including said contact surface is free from fiber reinforcing layers;

wherein the substrate has a density between 800 and 1800 kg/m$^3$ in foamed form;

wherein a density of the polymeric foamed layer is less than 120 kg/m$^3$;

wherein the top layer comprises a decorative layer and a wear layer, said wear layer is a transparent and filler-free layer of PVC comprising 10 to 40 phr of plasticizer selected from the group consisting of esters of phthalic acid, esters of iso- or terephthalic acid, esters of trimellitic acid, esters of adipic acid, esters of phosphoric acid, and combinations thereof, wherein a thickness of said wear layer is between 0.2 and 0.8 mm;

wherein the top layer further comprises at least one flexible or semi-rigid polymer layer under the decorative layer such that the at least one flexible or semi-rigid polymer layer includes more than 10 phr plasticizer;

wherein the decorative layer is a decorative film;

wherein the floor element is provided on one or more sides with a coupling means for coupling two of such floor elements to each other;

wherein the layer of foamed rigid PVC is directly bonded to the polymeric foamed layer.

2. The floor element of claim 1, wherein the polymeric foamed layer has a thickness between 0.75 and 2.0 mm.

3. The floor element of claim 1, wherein the polymeric foamed layer consists of open-cell foam.

4. The floor element of claim 3, wherein the substrate is a closed-cell foam structure.

5. The floor element of claim 1, wherein the polyethylene is crosslinked polyethylene.

6. The floor element of claim 1, wherein the top layer is layered and consists of N polymer layers, N>2, and on this top layer optionally a coating, wherein $$d * \left( -0.2 * \left( \sum_{i=1}^{N} d_i * P_i \right) + 62 \right) < 300$$

wherein d is a total thickness of the substrate and the top layer, $d_i$ is a thickness of the i-th of the N polymer layers and expressed in s millimeters, wherein $P_i$ is how much plasticizer there is in the polymer of an i-th of the N polymer layers, expressed as parts per hundred by weight of said polymer in said i-th of the N polymer layers.

7. The floor element of claim 6, wherein $$d * \left( -0.2 * \left( \sum_{i=1}^{N} d_i * P_i \right) + 62 \right) < 280$$

8. The floor element of claim 1, wherein the layer consisting of foamed rigid polyvinyl chloride (PVC) comprises up to 300 phr of fillers.

9. A floor element comprising:

a substrate, a top layer on one side of the two sides of the substrate, wherein the top layer, including a contact surface between said substrate and said top layer, is free from fiber reinforcing layers, and a polymeric foamed layer of polyethylene on another side of the two sides of the substrate;

wherein the substrate consists essentially of a layer of foamed rigid polyvinyl chloride (PVC) provided in the contact surface with the top layer, the layer comprising:

10 phr or less of plasticizer selected from the group consisting of esters of phthalic acid, esters of iso- or terephthalic acid, esters of trimellitic acid, esters of adipic acid, esters of phosphoric acid, and combinations thereof, and at least 100 phr of fillers, wherein the top layer is layered and consists essentially of N polymer layers, N>2, one layer being a wear layer and one layer being a decorative layer, wherein a coating is optionally provided on the top layer, wherein the substrate has a density between 800 and 1800 kg/m$^3$ in foamed form;

wherein a density of the polymeric foamed layer is less than 120 kg/m$^3$;

wherein the layer of foamed rigid PVC is directly bonded to the polymeric foamed layer;

and wherein $$d * \left( -0.2 * \left( \sum_{i=1}^{N} d_i * P_i \right) + 62 \right) < 300$$

wherein d is a total thickness of the substrate and the top layer, $d_i$ is a thickness of the i-th of the N polymer layers and expressed in s millimeters, wherein $P_i$ is how much plasticizer there is in the polymer of an i-th of the N polymer layers, expressed as parts per hundred by weight of said polymer in said i-th of the N polymer layers;

wherein the wear layer is a transparent and filler-free layer of PVC comprising 10 to 40 phr of plasticizer selected from the group consisting of esters of phthalic acid, esters of iso- or terephthalic acid, esters of trimellitic acid, esters of adipic acid, esters of phosphoric acid, and combinations thereof, wherein a thickness of said wear layer is between 0.2 and 0.8 mm;

wherein the top layer further comprises at least one flexible or semi-rigid polymer layer under the decorative layer such that the at least one flexible or semi-rigid polymer layer includes more than 10 phr plasticizer; and wherein the decorative layer is a decorative film.

10. The floor element of claim 9, wherein the floor element is provided on one or more sides with a coupling means for coupling two of such floor elements to each other.

* * * * *